United States Patent
Mongillo et al.

(10) Patent No.: US 10,711,618 B2
(45) Date of Patent: Jul. 14, 2020

(54) TURBINE COMPONENT WITH TIP FILM COOLING AND METHOD OF COOLING

(71) Applicant: United Technologies Corporation, Farmington, CT (US)

(72) Inventors: Dominic J. Mongillo, West Hartford, CT (US); Wolfgang Balzer, Wethersfield, CT (US); Atul Kohli, Tolland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 360 days.

(21) Appl. No.: 15/605,458

(22) Filed: May 25, 2017

(65) Prior Publication Data
US 2018/0340426 A1 Nov. 29, 2018

(51) Int. Cl.
*F01D 5/18* (2006.01)
*F01D 5/20* (2006.01)
*F02C 3/04* (2006.01)

(52) U.S. Cl.
CPC .............. *F01D 5/186* (2013.01); *F01D 5/20* (2013.01); *F02C 3/04* (2013.01); *F05D 2220/32* (2013.01); *F05D 2230/00* (2013.01); *F05D 2240/307* (2013.01); *F05D 2250/711* (2013.01)

(58) Field of Classification Search
CPC ... F01D 5/186; F01D 5/20; F02C 3/04; F05D 2220/32
USPC .......... 416/97 R, 92, 235, 228, 224; 415/115
See application file for complete search history.

(56) References Cited

U.S. PATENT DOCUMENTS

| | | | |
|---|---|---|---|
| 5,192,192 A * | 3/1993 | Ourhaan | F01D 5/18 415/115 |
| 6,494,678 B1 | 12/2002 | Bunker | |
| 7,704,045 B1 * | 4/2010 | Liang | F01D 5/20 416/228 |
| 7,980,820 B2 | 7/2011 | Gayman et al. | |
| 8,469,666 B1 * | 6/2013 | Liang | F01D 5/187 415/115 |
| 9,103,217 B2 * | 8/2015 | Giglio | F01D 5/186 |
| 9,470,096 B2 | 10/2016 | Mishra et al. | |
| 10,227,876 B2 * | 3/2019 | Buhler | F01D 5/186 |
| 2008/0131278 A1 * | 6/2008 | Correia | F01D 5/187 416/23 |

(Continued)

FOREIGN PATENT DOCUMENTS

| | | |
|---|---|---|
| EP | 1927727 A2 | 6/2008 |
| EP | 3009600 A1 | 4/2016 |
| EP | 3150803 A1 | 4/2017 |

OTHER PUBLICATIONS

European Search Report EP 18 17 4180.

*Primary Examiner* — Hai H Huynh
*Assistant Examiner* — Gonzalo Laguarda
(74) *Attorney, Agent, or Firm* — Cantor Colburn LLP

(57) ABSTRACT

In one embodiment, a component for a gas turbine engine is provided. The component including: an airfoil having a tip portion; a tip shelf located in the tip portion; a first plurality of cooling openings located in an edge of the tip shelf that extends along at least a portion of a pressure side of the airfoil; and a second plurality of cooling openings located in an edge of the tip portion proximate to the tip shelf that extends along at least a portion of a pressure side of the tip portion.

20 Claims, 8 Drawing Sheets

(56) References Cited

U.S. PATENT DOCUMENTS

| | | | |
|---|---|---|---|
| 2014/0030102 A1* | 1/2014 | Mishra | F01D 5/20 416/223 R |
| 2014/0322028 A1 | 10/2014 | Grohens et al. | |
| 2015/0118063 A1* | 4/2015 | Lewis | F01D 5/20 416/97 R |
| 2017/0089206 A1* | 3/2017 | Quach | F01D 5/187 |

* cited by examiner

TURBINE COMPONENT WITH TIP FILM COOLING AND METHOD OF COOLING

BACKGROUND

This disclosure relates generally to gas turbine engines and, more particularly, tip film cooling for turbine components.

Turbine blades and BOAS (blade outer air seals) are designed to have very tight clearances at cruise to improve aerodynamic performance. At other performance points in the flight envelope the blade and the BOAS may be rubbing causing the thermal barrier coating to be removed. This makes it notoriously difficult to cool the tips of the turbine blades.

Accordingly, it is desirable to provide turbine airfoils and/or engines with airfoils that reduce the heat load on the tip of the airfoil as well as preventing the detrimental effects associated with leakage airflows.

BRIEF DESCRIPTION

In one embodiment, a component for a gas turbine engine is provided. The component including: an airfoil having a tip portion; a tip shelf located in the tip portion; a first plurality of cooling openings located in an edge of the tip shelf that extends along at least a portion of a pressure side of the airfoil; and a second plurality of cooling openings located in an edge of the tip portion proximate to the tip shelf that extends along at least a portion of a pressure side of the tip portion.

In addition to one or more of the features described above, or as an alternative to any of the foregoing embodiments, each of the first plurality of cooling openings may have a diffuser portion formed in the edge of the tip shelf.

In addition to one or more of the features described above, or as an alternative to any of the foregoing embodiments, each of the second plurality of cooling openings may have a diffuser portion formed in the edge of the tip portion.

In addition to one or more of the features described above, or as an alternative to any of the foregoing embodiments, each diffuser portion may have a fillet edge located therein.

In addition to one or more of the features described above, or as an alternative to any of the foregoing embodiments, at least a portion of the edge of the tip shelf may be convex in shape.

In addition to one or more of the features described above, or as an alternative to any of the foregoing embodiments, at least a portion of the edge of the tip shelf may be convex in shape.

In addition to one or more of the features described above, or as an alternative to any of the foregoing embodiments, a squealer pocket may be located in a surface of the tip portion.

In addition to one or more of the features described above, or as an alternative to any of the foregoing embodiments, the component may be a turbine blade.

In addition to one or more of the features described above, or as an alternative to any of the foregoing embodiments, each of the first plurality of cooling openings may have a diffuser portion formed in the edge of the tip shelf and each of the second plurality of cooling openings may have a diffuser portion formed in the edge of the tip portion.

In addition to one or more of the features described above, or as an alternative to any of the foregoing embodiments, each diffuser portion may have a fillet edge located therein.

In addition to one or more of the features described above, or as an alternative to any of the foregoing embodiments, at least one diffuser portion of the first plurality of cooling openings and at least one diffuser portion of the second plurality of cooling openings may have a fillet edge located therein.

In addition to one or more of the features described above, or as an alternative to any of the foregoing embodiments, at least a portion of the edge of the tip shelf may be convex in shape and at least a portion of the edge of the tip shelf may be convex in shape.

In addition to one or more of the features described above, or as an alternative to any of the foregoing embodiments, at least a portion of the edge of the tip shelf may be convex in shape and at least a portion of the edge of the tip shelf may be convex in shape.

In addition to one or more of the features described above, or as an alternative to any of the foregoing embodiments, further including a plurality of squealer pockets located in a surface of the tip portion.

In addition to one or more of the features described above, or as an alternative to any of the foregoing embodiments, further including a squealer pocket located in a surface of the tip portion.

In yet another embodiment, a gas turbine engine is provided. The gas turbine engine having: a compressor section; a combustor section; and a turbine section; wherein the turbine section includes a plurality of rotors having a plurality of radially disposed rotor blades at least some of the plurality of radially disposed rotor blades having: an airfoil, the airfoil having a tip portion; a tip shelf located in the tip portion; a first plurality of cooling openings located in an edge of the tip shelf that extends along at least a portion of a pressure side of the airfoil; and a second plurality of cooling openings located in an edge of the tip portion proximate to the tip shelf that extends along at least a portion of a pressure side of the tip portion.

In addition to one or more of the features described above, or as an alternative to any of the foregoing embodiments, each of the first plurality of cooling openings may have a diffuser portion formed in the edge of the tip shelf and each of the second plurality of cooling openings may have a diffuser portion formed in the edge of the tip portion.

In addition to one or more of the features described above, or as an alternative to any of the foregoing embodiments, at least one diffuser portion of the first plurality of cooling openings and at least one diffuser portion of the second plurality of cooling openings may have a fillet edge located therein.

In addition to one or more of the features described above, or as an alternative to any of the foregoing embodiments, at least a portion of the edge of the tip shelf may be convex in shape and at least a portion of the edge of the tip shelf may be convex in shape.

In yet another embodiment, a method of cooling a portion of a component of a gas turbine engine is provided. The method including the steps of: forming a first plurality of cooling openings in an edge of a tip shelf that extends along at least a portion of a pressure side of an airfoil of the component; and forming a second plurality of cooling openings in an edge of a tip portion of the airfoil proximate to the tip shelf that extends along at least a portion of a pressure side of the tip portion, wherein the first plurality of cooling openings and the second plurality of cooling openings are in fluid communication with an internal plenum of the airfoil.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Various embodiments of the present disclosure are related to turbine blades with radially oriented edge trenched cooling openings arranged to abate the heat load proximate the pressure side tip and OD most circumferential tip surface of the airfoil of the turbine blade as well as preventing the detrimental effects associated excessive heat loads and leakage airflows. Although engine turbine blade airfoils are discussed herein, it is understood that embodiments of this disclosure may be applied on any turbomachinery component that requires the aforementioned cooling or tip cooling for example, the cooling openings may be positioned on compressor blades of the gas turbine engine, stationary vanes, blade outer air seals (BOAS).

A detailed description of one or more embodiments of the disclosed apparatus and method are presented herein by way of exemplification and not limitation with reference to the FIGS.

Figure 1:
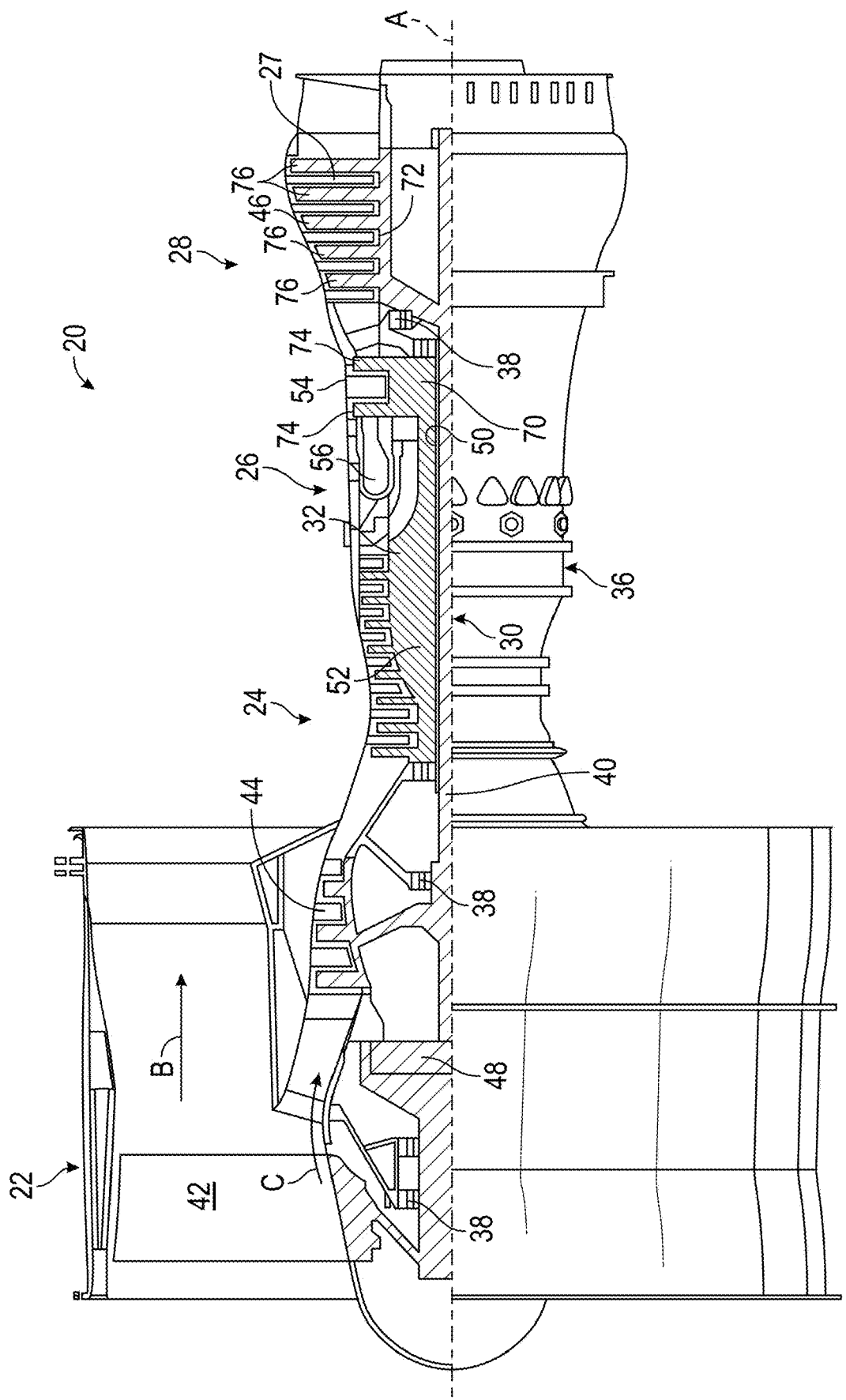
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including but not limited to three-spool architectures, single spool architectures, etc.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(158.7° R)]$^{0.5}$. The "Low corrected fan tip speed" as disclosed herein according to one non-limiting embodiment is less than about 1150 ft/second (350.5 m/sec).

The high pressure turbine 54 or low pressure turbine 46 of the turbine section 28 may include a plurality of turbine discs 70, 72 that each rotate about the axis A. As is known in the related arts, the high pressure turbine 54 may include a plurality of stages each having a plurality of turbine blades 74 mounted to respective turbine disk of each stage. Similarly, the low pressure turbine 46 may have a plurality of turbine blades 76.

Figure 2A:
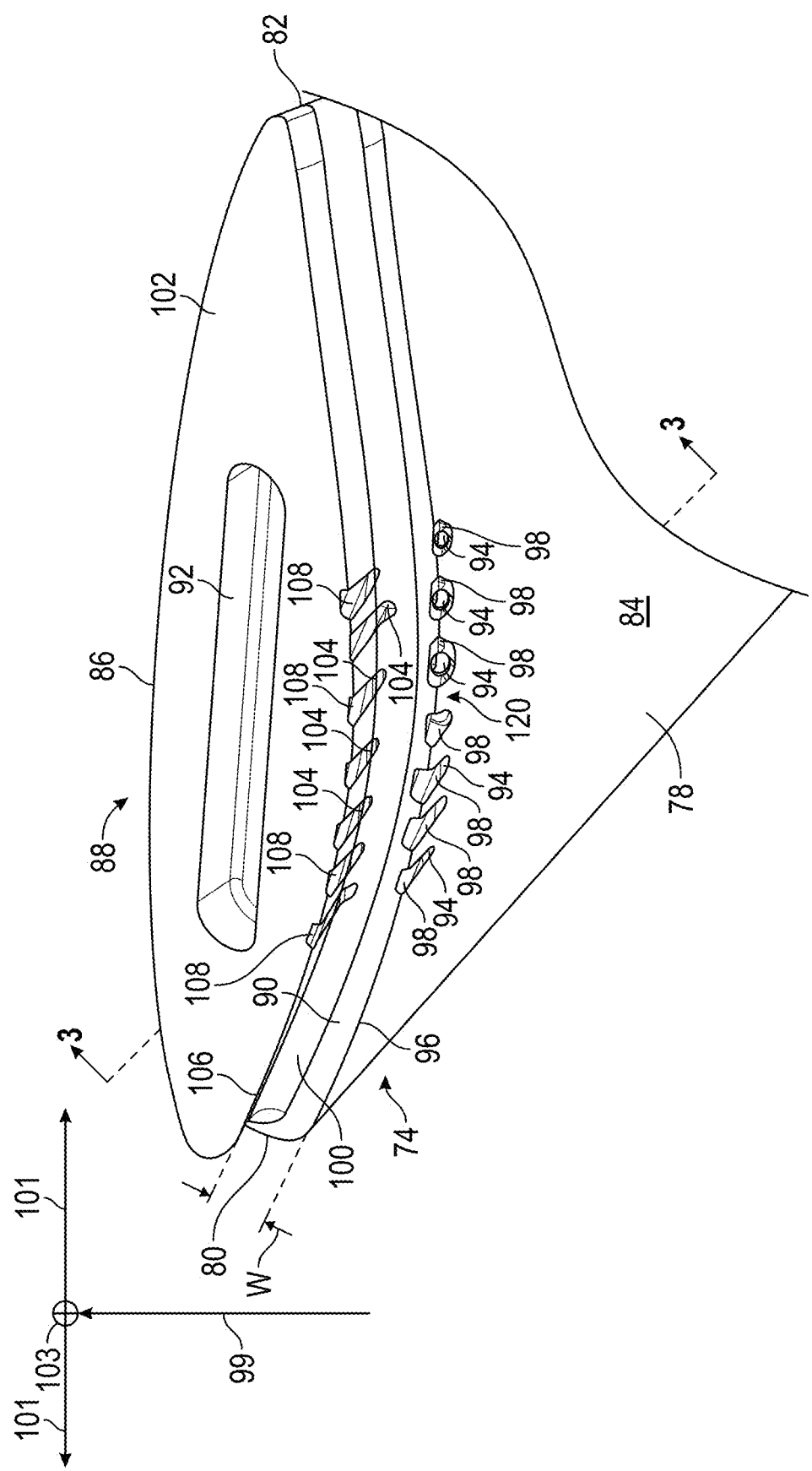
FIG. 2A is a perspective view illustrating a tip portion of a turbine blade in accordance with an embodiment of the disclosure.

Referring now to FIG. 2A is a perspective view of a portion of one embodiment of a turbine blade or component 74 for use in the turbine section 28 of the gas turbine engine 20 is illustrated. In one embodiment, the turbine blade 74 may be a blade in the high pressure turbine 54. Still further and in one non-limiting embodiment, the turbine blade 74 may be one of several blades that are located downstream from the combustor 56. Since turbine blade 74 is downstream from the combustor section 26 and it is proximate to the combustor it is desirable to provide the turbine blade 74 with a cooling film or cooling fluid flows.

Although, turbine blade 74 is discussed as a blade of the high pressure turbine 54, various embodiments of the present disclosure may be incorporated into a turbine blade 76 of the low pressure turbine 46 or turbine blades 74 and 76 of both the high pressure turbine 54 and the low pressure turbine 46.

The turbine blade 72 has an airfoil 78 with a leading edge 80, a trailing edge 82, a pressure side 84 and a suction side 86. The airfoil 78 terminates at a tip portion 88, which is located in close proximity to a blade outer air seals (BOAS).

In accordance with an embodiment of the present disclosure, the tip portion 88 of the airfoil 78 is provided with a tip shelf 90. The tip shelf 90 also removes the tip edge on the pressure side where the heat load is extremely high and the blade is prone to rapid oxidation. In addition, the tip portion 88 may also be provided with a squealer pocket 92 or a plurality of squealer pockets 92. Squealer pockets are used in turbine blades to reduce the leakage flow over the tip and also to reduce the heat load to the part. The squealer pocket configuration creates an effective labyrinth seal which reduces the amount of tip leakage and brings with it a performance benefit. The squealer pocket has thermal benefits as the pocket itself experiences lower heat transfer coefficients as the pocket acts as a mini-plenum which reduces the velocity of the gaspath air in this region. Also the squealer pocket can be coated with thermal barrier coatings which do not get abraded off (even if blade tip rub does occur) since they are recessed from the tip surface which provides additional thermal benefits. Additionally, the squealer pocket removes a significant amount of thermal mass from the tip region of the airfoil. The reduction of thermal mass in the tip enables the transient response of the surrounding tip surface walls to heat and cool at a more uniform rate and therefore minimizes the presence of large thermal gradients that would exist due to the relatively large transient metal temperature gradients which result in high compressive thermal strains. The resulting high compressive strains may initiate Thermal Mechanical Fatigue cracks (TMF) which can propagate into the wall substrate and produce a thru wall crack exposing the internal cooling cavity. In this instance the bare alloy surfaces along the TMF crack front have reduced oxidation capability due to the lack of protective ceramic and metallic coating. As a result the base alloy begins oxidizing at a faster rate compromising the integrity and functionality of the local convective and film cooling proximate the tip region of the airfoil. In an alternative embodiment, airfoil 78 may be formed without squealer pocket 92.

In the illustrated embodiment, the tip shelf 90 extends from the leading edge 80 to the trailing edge 82 and the tip shelf 90 is located on the pressure side 84 of the airfoil 78. It is, of course, understood that the tip shelf 90 may only extend partially between the leading edge 80 and the trailing edge 82 of the airfoil 78.

In one embodiment, a plurality of cooling openings 94 or a first plurality of cooling openings 94 are located proximate to or in an edge 96 of the pressure side 84 of the airfoil 78 defining one edge of the tip shelf 90. In one embodiment, openings 94 each have a diffuser portion 98 that extends through the edge 96. As illustrated and in one embodiment, the diffuser portion 98 fans outwardly in a predominately radial and axial direction from opening 94 and may comprise a trenched or grooved portion that extends through edge 96. See also angles $\theta_{1a}$ and $\theta_{2a}$.

In one non-limiting embodiment and as illustrated herein, the aforementioned radial direction may be represented by arrows 99 and the axial direction may be represented by arrows 101. Also, a circumferential direction is represented by axis 103, which is into and out of the plane illustrated by at least FIGS. 2A-2C. The diffuser portion 98 is configured to direct a flow or cooling air or film across the edge 96, which further enhances the cooling attributes of the cooling openings 94. In addition and by locating the diffuser portion 98 in edge 96, a portion of the edge 96 is removed thus reducing the amount of edge 96 that is in contact with the hot freestream gas temperature exiting from the combustor 56. Still further, the cooling openings 94 and their associated diffuser portions 98 are predominately radially orientated such the cooling air is at least initially directed generally in a radial direction represented by arrow 99. In addition and in one embodiment, the diffuser portion 98 may extend circumferentially into the airfoil 78. See for example angles $\theta_{3a}$.

The airfoil 78 also has a wall portion, wall or surface 100 that extends radially (arrows 99) from the tip shelf 90 to a tip surface 102 of the airfoil 78. As illustrated, the squealer pocket 92 is formed in the tip surface 102 of the airfoil 78.

In one embodiment, a second plurality of cooling openings 104 are located proximate to or in an edge 106 of the wall portion 100 defining one edge of the tip surface 102. In one embodiment, the second plurality of cooling openings 104 each have a diffuser portion 108 that extends through the edge 106. As illustrated and in one embodiment, the diffuser portion 108 may comprise a trenched or grooved portion that extends through edge 106. The diffuser portion 108 fans outwardly from opening 104 and is configured to direct a flow or cooling air or film across the edge 106, which further enhances the cooling attributes of the cooling openings 104. In addition and by locating the diffuser portion 108 in edge 106, a portion of the edge 106 is removed thus reducing the amount of edge 106 that is in contact with the hot gases exiting from the combustor 56. Still further, the cooling openings 104 and their associated diffuser portions 108 are radially orientated such the cooling air is at least initially directed generally in a radial direction represented by arrow 99. Additionally the diffuser portions 108 of the film hole openings 104 also provide lateral spreading of the film flow in predominately an axial direction (arrows 101) from leading edge 80 to trailing edge 82 along the radial edge 106 and tip surface 102. See also angles $\theta_{1b}$ and $\theta_{2b}$. In this instance the lateral spreading provides increased film coverage over a larger percentage of the edge surface 106 and tip surface 102, prohibiting hot gases from coming in contact with the airfoil tip portion 88. In addition, this lateral spreading of the film flow may decrease the amount of air flow or pressure of an air flow required for cooling of the airfoil 78.

The diffuser portions 108 of film hole openings 104 are also expanded in the circumferential direction (axis 103) in a streamwise direction consistent with the airfoil tip portion 88 aerodynamic pressure gradients. See also angle $\theta_{3b}$. The circumferential diffusion (into and out of the plane illustrated in at least FIGS. 2A-2C and more particularly the circumferential diffusion out of the plane illustrated in at least FIGS. 2A-2C) enables the momentum of the film flow emanating from the diffuser portion 108 to be better aligned with the tip surface 102 aerodynamic streamlines (illustrated by arrows 122), providing more effective film cooling of the tip surface 102 and airfoil tip portion 88. In one embodiment, the circumferential diffusion may only be outwardly along axis 103 or in other words towards the pressure side of the airfoil 78.

In one embodiment, the cooling openings 94 and 104 and their associated diffusers 98 and 108 provide fluid communication of a cooling fluid (e.g., air) from one of a plurality of internal plenums 114 of the airfoil 78.

As it pertains to film cooling holes 94 and 104 and their associated diffuser sections 98 and 108 respectively, it should be understood that the corresponding diffusion angles and expansion ratios may vary as a function of the local film hole pressure, mass, and momentum flux ratios. The film holes 94 and 104 and the corresponding diffuser section 98 and 108 area (expansion) ratios will also be dependent on local pressure side tip shelf radial height, H, and width W geometry requirements. The expansion angles $\theta_{1a}$, $\theta_{2a}$ and $\theta_{1b}$, $\theta_{2b}$ of the film hole diffusers may range in the lateral direction or axial direction (arrows 101) from 0°-15° on both the upstream (towards the leading edge 80, $\theta_{1a}$, $\theta_{1b}$) and downstream (towards the trailing edge 82, $\theta_{2a}$, $\theta_{2b}$) sides of the diffuser. As used herein and as illustrated in the attached FIGS., the aforementioned angles $\theta_{1a}$, $\theta_{1b}$, $\theta_{2a}$, and $\theta_{2b}$ are referenced with respect to a center line 105, 107 of the openings 94, 104. It is to be understood that the laterally diffusion angles $\theta_{1a}$, $\theta_{1b}$, $\theta_{2a}$, and $\theta_{2b}$ for each diffuser may be equivalent to each other and/or differ from each other depending on local external airfoil tip region 88 pressure gradients. It is, of course, understood that the aforementioned diffuser angles $\theta_{1a}$, $\theta_{1b}$, $\theta_{2a}$, and $\theta_{2b}$ may vary to be greater or less than the aforementioned values and/or ranges and various embodiments of the present disclosure are not necessarily limited to the aforementioned values.

Similarly, the circumferential diffusion angles $\theta_{3a}$, $\theta_{3b}$ may also vary between 0°-20° depending on a diffuser section length (illustrated by the brackets 98, 108 in FIG. 3) and area ratio requirements to ensure film cooling flow remains attached as it is expanded through the diffuser 98, 108 in order to achieve optimal film cooling coverage and film cooling effectiveness performance. As used herein the expansion angles $\theta_{1a}$, $\theta_{1b}$, $\theta_{2a}$, and $\theta_{2b}$ may be with respect to a central axis 105, 107 of the openings 94, 104 as it extends through their associated diffusers 98, 108. The circumferential diffuser angle $\theta_{3a}$ for diffusers 98 is determined with respect to a line 109 for diffusers 98 and the circumferential diffuser angle $\theta_{3b}$ for diffusers 108 is determined with respect to a line 111 for diffusers 108. Line 109 is parallel to line 105 and is an extension of a sidewall of a film metering section 113 of hole 94 and line 111 is parallel to line 107 and is an extension of a sidewall of a film metering section 115 of hole 104. Accordingly, the circumferential diffuser angles $\theta_{3a}$, $\theta_{3b}$ for diffusers 98 and 108 is an angle in the circumferential direction 103 into the body of the airfoil 78 proximate to the tip portion 88. It is, of course, understood that the aforementioned diffuser angles $\theta_{3a}$, $\theta_{3b}$ may vary to be greater or less than the aforementioned values and/or ranges and various embodiments of the present disclosure are not necessarily limited to the aforementioned values.

The diffuser portions 98 and 108 may be configured to have any suitable shape. For example, they may have a curved aspect to them (e.g., semi-elliptical in shape or semi-circular in shape). Alternatively, they may have a more linear shape such as a rectangular shape or square shape or trapezoidal shape. Still further, they may have any other suitable shape, such as a triangular shape or any other suitable shape having straight and/or curved sides or surfaces. In yet another embodiment, the diffuser portions 98, 108 may have a multi-lobed shape as illustrated in FIGS. 2D and 2E. Still further an in any of the aforementioned embodiments, the cooling openings 94 and 104 may have a circular or elliptical shape.

Still further, a central axis 105 of some of the cooling openings 94 and their associated diffusers 98 may be angularly oriented either towards the leading edge 80 or trailing edge 82 of the airfoil 78. For example and due to a particular cooling requirement, a single or a plurality of cooling openings 94 and their associated diffusers 98 may have a different angular orientation of their central axis 105 with respect to the leading edge 80 or trailing edge 82 of the airfoil 78 than other cooling openings 94 and their associated diffusers 98. In addition, a central axis 107 of some of the cooling openings 104 and their associated diffusers 108 may be angularly oriented either towards the leading edge 80 or trailing edge 82 of the airfoil 78. For example and due to a particular cooling requirement, a single or a plurality of cooling openings 104 and their associated diffusers 108 may have a different angular orientation of their central axis 107 with respect to the leading edge 80 or trailing edge 82 of the airfoil 78 than other cooling openings 104 and their associated diffusers 108.

Still further and in yet another embodiment, array 116 may only have some of the cooling openings 94 and their associated diffusers 98 with a central axis 105 angled towards or away from the leading edge 80 and/or the trailing edge 82. Alternatively, array 118 may only have some of the cooling openings 104 and their associated diffusers 108 with a central axis 107 angled towards or away from the leading edge 80 and/or the trailing edge 82. In yet another embodiment, both arrays 116 and 118, may have cooling openings 94, 104 and their associated diffusers 98, 108 with their central axis 105, 107 angled towards or away from the leading edge 80 and/or the trailing edge 82.

Figure 5:
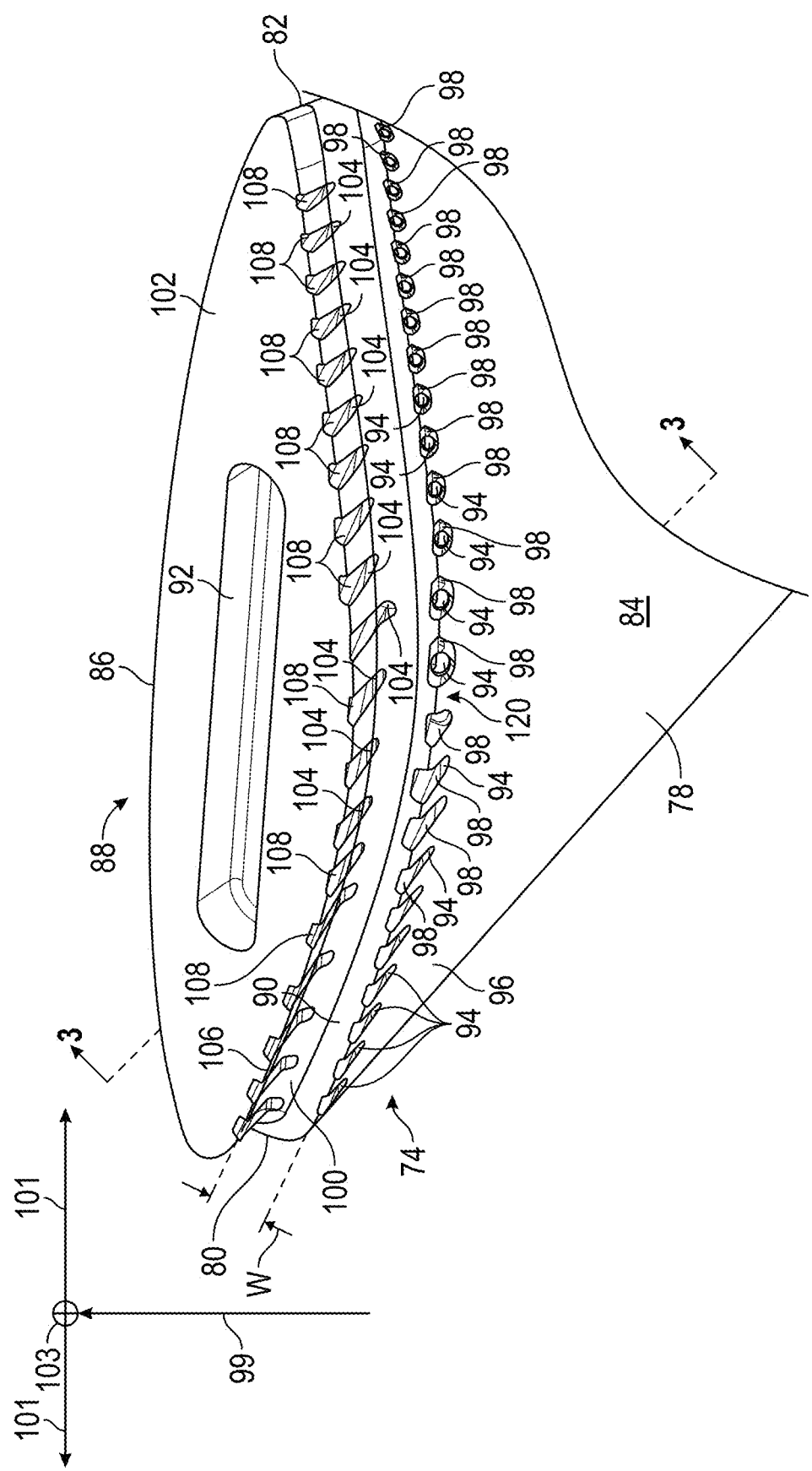
FIG. 5 is a perspective view illustrating a tip portion of a turbine blade in accordance with an alternative embodiment of the disclosure.

Moreover and in yet another embodiment, the density or spacing of the cooling openings 94, 104 and their associated diffusers 98, 108 in arrays 116, 118 may vary as desired. For example, some cooling openings 94, 104 and their associated diffusers 98, 108 may have a space or gap between each other that is smaller or greater than other cooling openings 94, 104 and their associated diffusers 98, 108. In addition and although the arrays 116 and 118 are illustrated as being centrally located on the chord of the airfoil, the arrays 116, 118 may have any configuration. For example, the arrays 116, 118 may extend from the leading edge to the trailing edge (See FIG. 5) or the arrays 116, 118 may be more closely located proximate to the leading edge or trailing edge. Still further, the arrays 116, 118 may have different configurations with respect to each other or they may be the same.

It is of course understood that any combination of the aforementioned configurations of the openings 94 and 104 and their associated diffuser portions 98 and 108 may be used in the arrays 116 and 118. Still further, each array 116 and 118 may have any combination of the aforementioned configurations of the openings 94 and 104 and their associated diffuser portions 98 and 108.

Figure 2B:
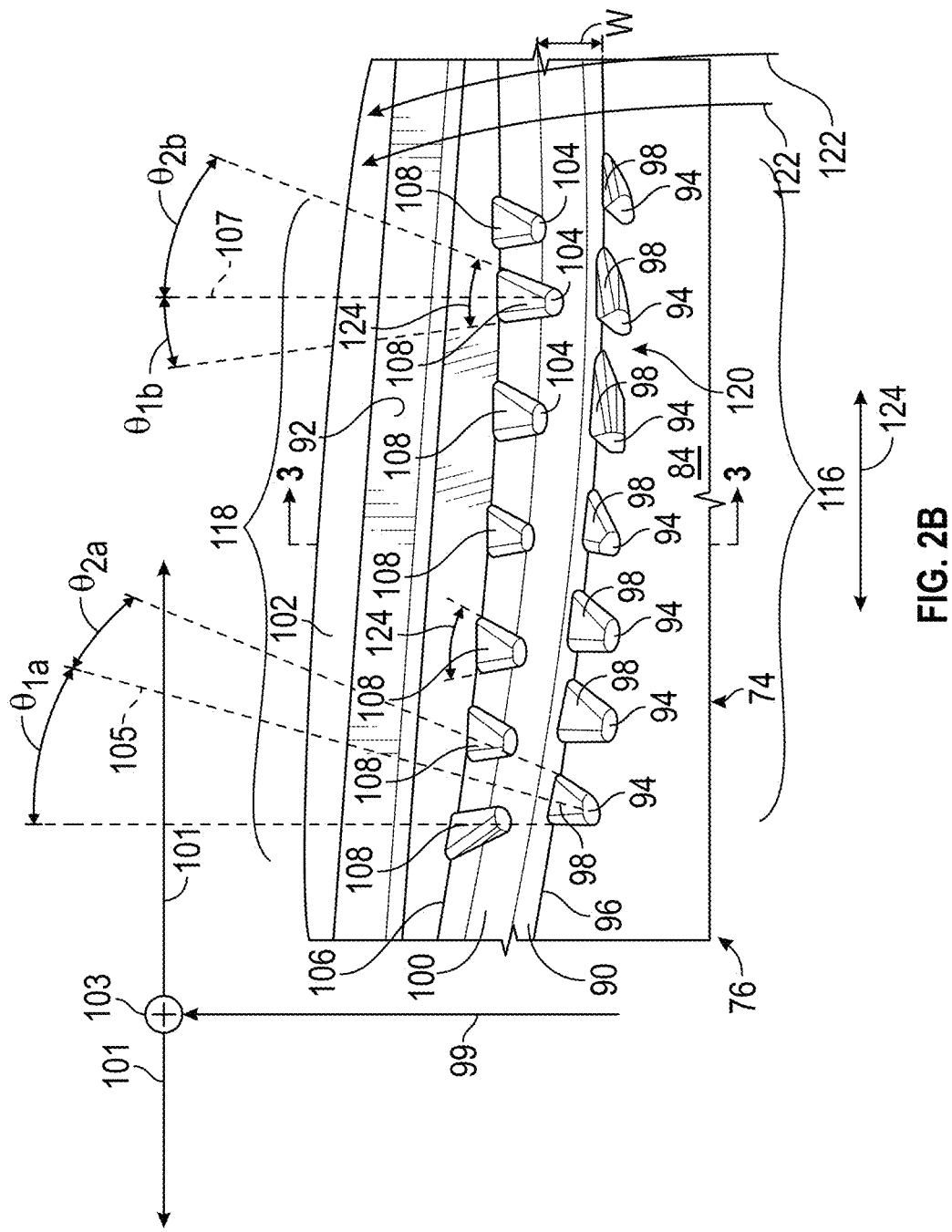
FIG. 2B is an enlarged perspective view of the tip portion illustrated in FIG. 2A.
Figure 2C:
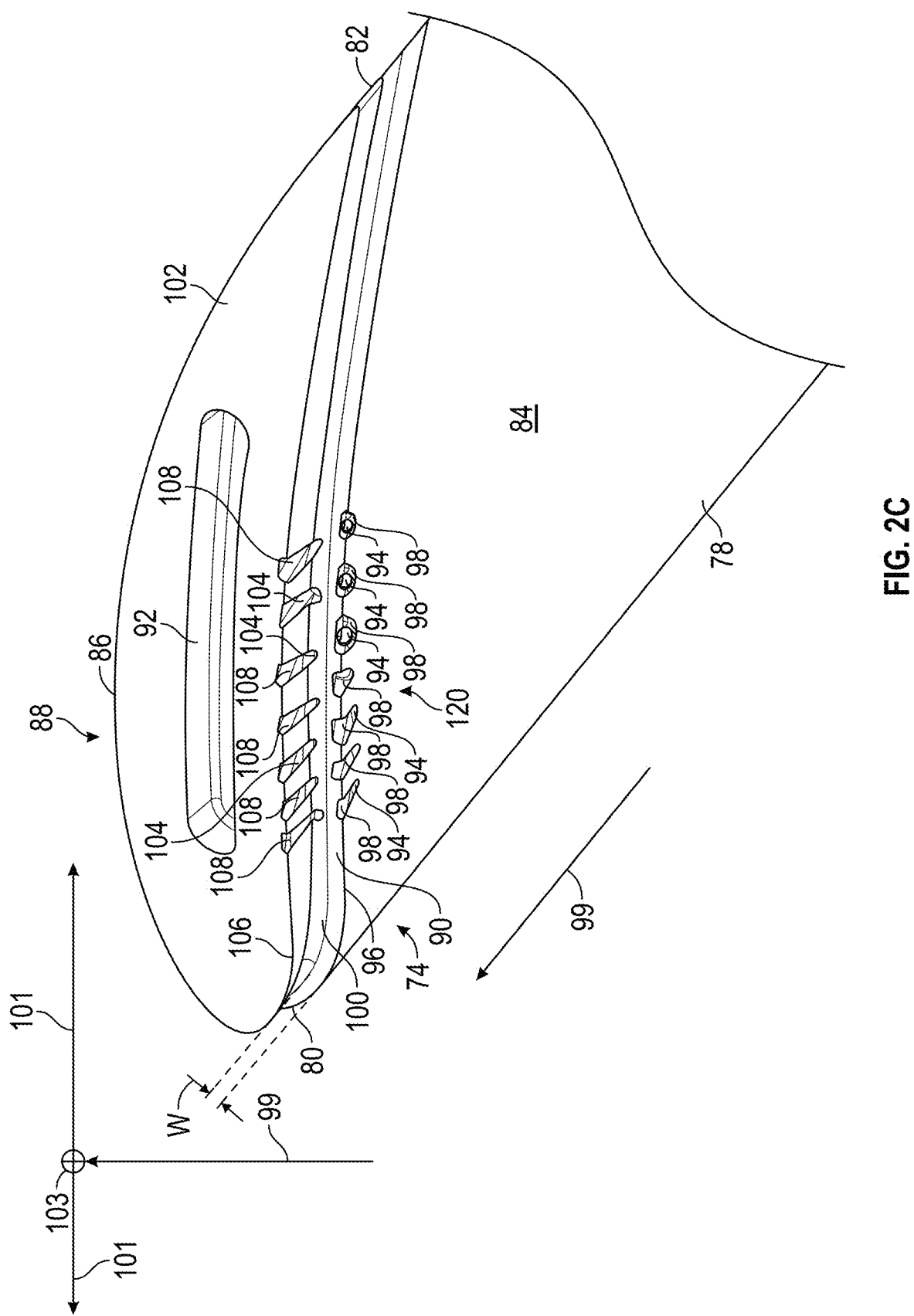
FIG. 2C is an enlarged perspective view of a tip portion according to an alternative embodiment.
Figure 2D:
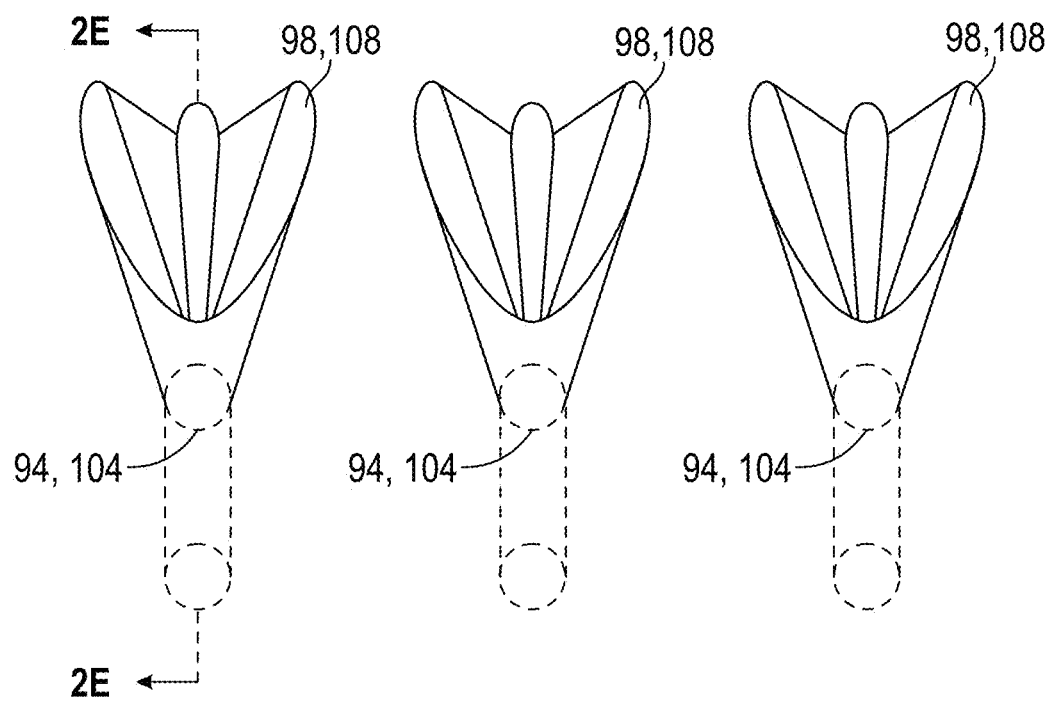
FIG. 2D is an enlarged view of a cooling opening and associated diffuser portions in accordance with an alternative embodiment of the present disclosure.
Figure 2E:
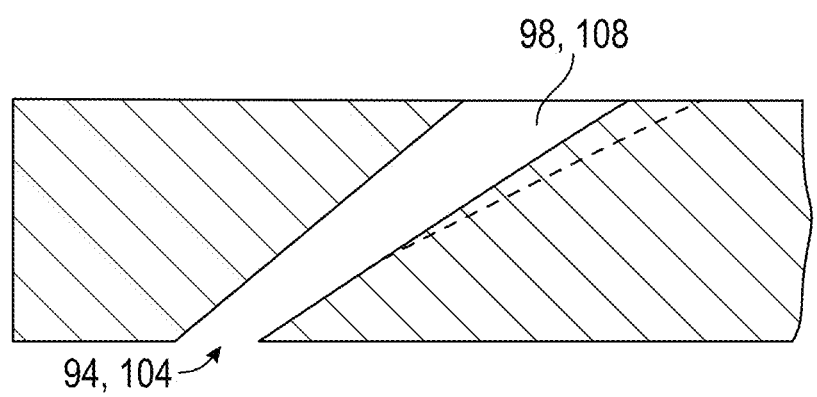
FIG. 2E is a view along lines 2E-2E of FIG. 2D.
Figure 3:
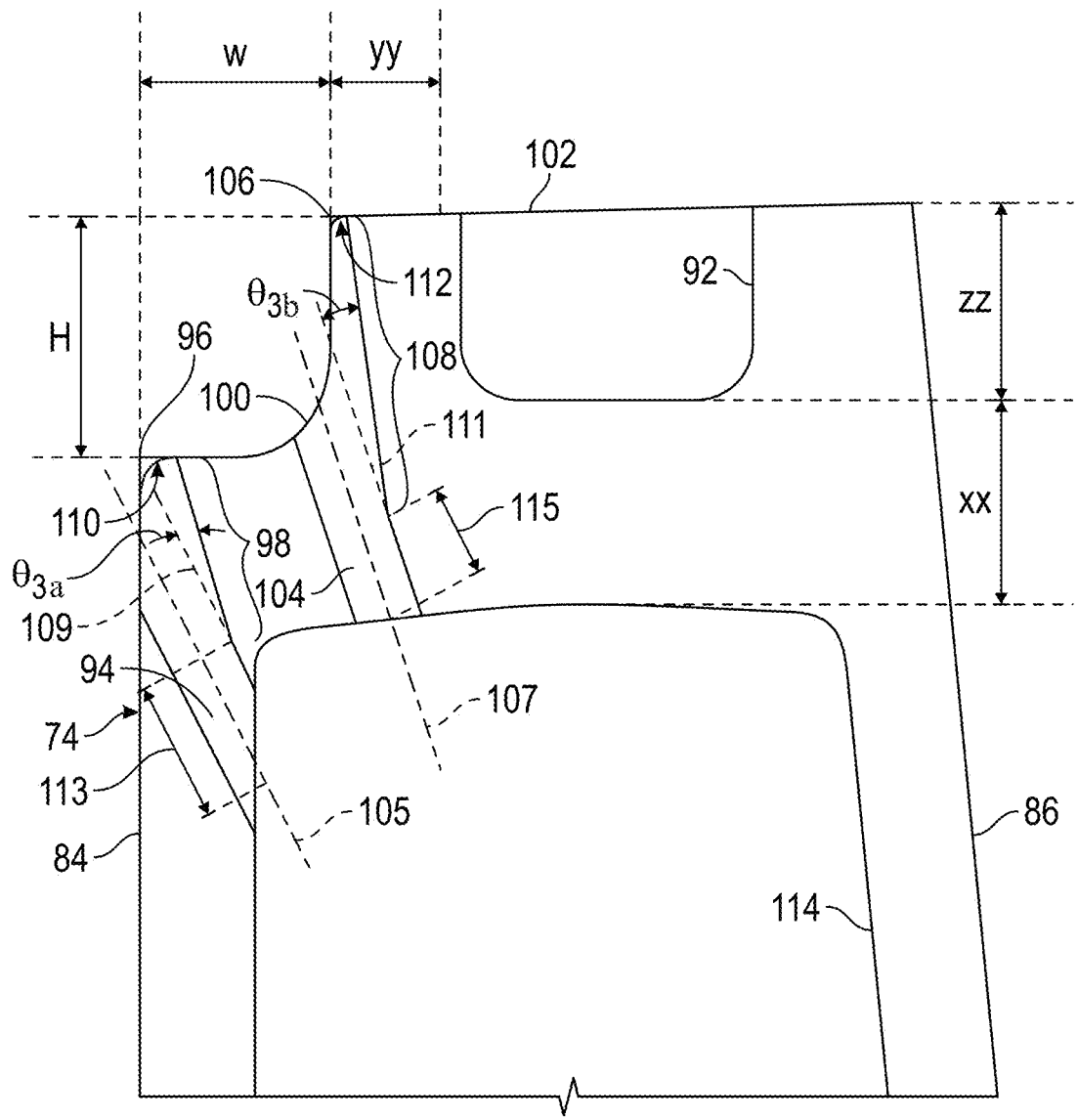
FIG. 3 is a cross-sectional view of a portion of the turbine blade illustrated in FIGS. 2A and 2B along lines 3-3.

Referring now to FIG. 3 a cross-sectional view of a portion of the turbine blade illustrated in FIGS. 2A and 2B is provided. Here, a cross-sectional view of the diffusers 98 and 108 of cooling holes or openings 94 and 104 are illustrated. In one non-limiting embodiment, a fillet edge 110 may be located in the portion of the diffuser 98 extending through edge 96. In addition, a fillet edge 112 may be located in the portion of the diffuser 106 extending through edge 106. In one embodiment, the fillet edges 110 and 112 may have a constant and/or variable radius along the axial length of the airfoil pressure side 84 tip surface edge 96 extending from leading edge 80 to the trailing edge 82. The range of fillet edge 110 may vary between 0.00 inches or centimeters (a discrete sharp edge) to a maximum radius equivalent to approximately 60% of the local pressure side circumferential shelf width, W, The circumferential width, W, of the pressure side tip shelf 90 can range between $1Dh \leq W \leq 5Dh$ of the cooling hole openings 94, wherein Dh is the hydraulic diameter of the cooling hole. For the case of a round hole, Dh=D wherein D is the diameter of the film metering section of the hole. In FIG. 3 the film metering section of holes 94 and 104 is illustrated by arrows 113 and 115. Similarly the fillet edge 112 may vary between 0.00" (a discrete sharp edge) to a maximum radius equivalent to approximately 60% of the local pressure side radial shelf height, H. The radial height, H, of the pressure side tip shelf may also vary between $1Dh \leq H \leq 5Dh$ of the cooling hole openings 104.

The film hole metering section 113, 115 may be referred to as the "meter" of the hole in the case of a shaped or diffused hole. The meter length refers to the streamwise length of the metering section of the cooling hole. The metering length of the film cooling hole is measured from the internal intercept point where the cooling hole breaks out along the internal wall surface, to a location that is coincident with the intersection of the end of the metering section and the start of the diffuser section as measured along the centerline of the film cooling hole. The metering length can range anywhere between $1.5 \leq Dh \leq 20$ depending on the total length of the film cooling hole. In one embodiment and in order to maximize the amount of expansion of the diffuser, for airfoil cooing walls the length of the metering section of the cooling hole may be $1.5 \leq Dh \leq 3$.

In alternative embodiments the fillet edge radius 112 may also be limited by the tip wall thickness, YY, formed by the radial surface of the pressure side tip shelf edge 106 and the radial surface of the squealer pocket edge, ZZ. Of course, dimensions greater or less than the aforementioned values are considered to be within the scope of the present disclosure. In one embodiment, the incorporation of the fillet edges 110 and 112 into the diffusers 98 and 106 will assist in locating and retaining a cooling film proximate to the tip portion 88 as it exits the diffuser of a cooling opening. FIG. 3 also illustrates a plenum 114 that is in fluid communication with at least some of the cooling holes or openings 94 and 104.

Figure 4A:
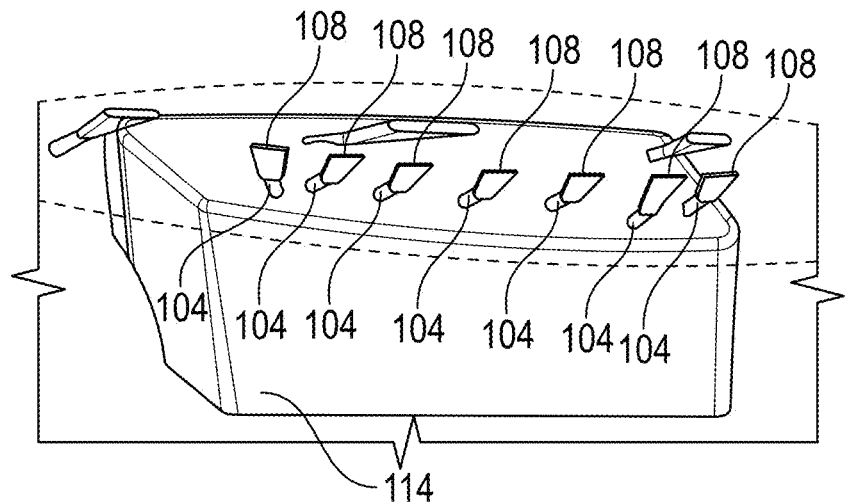
FIGS. 4A and 4B are perspective views of illustrating internal intercept locations of film holes of the turbine blade illustrated in at least FIGS. 2A and 2B.
Figure 4B:
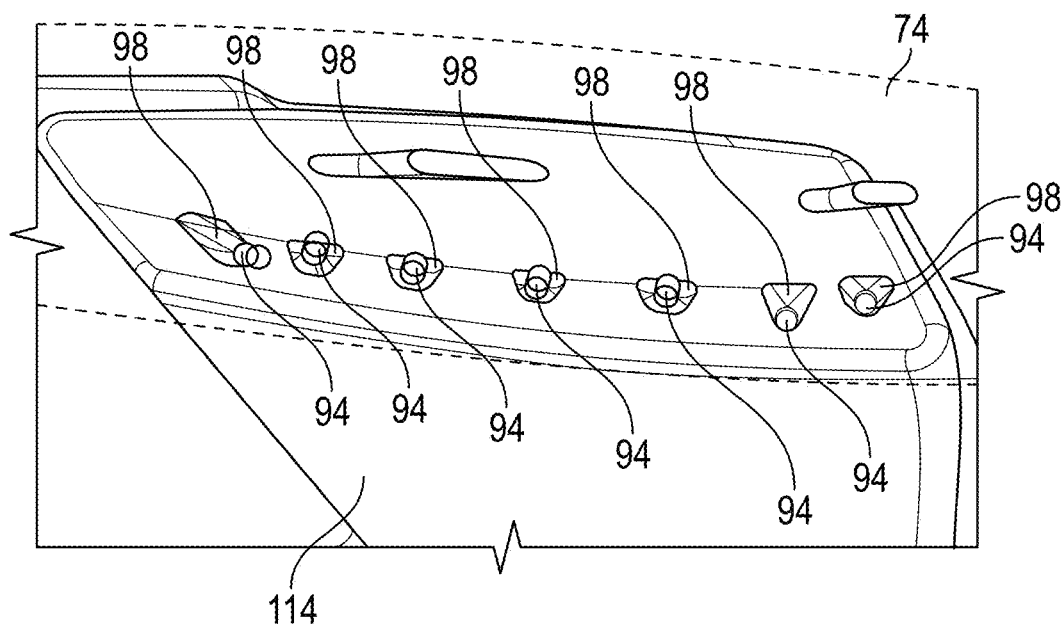

FIGS. 4A and 4B are perspective views illustrating internal intercept locations of film holes or cooling openings 94 and 104 of the turbine blade 74 illustrated in at least FIGS. 2A and 2B. In these views and for ease of review, a diagrammatic illustration of the turbine blade is provided wherein features have been removed and the exterior of the blade 74 is partially illustrated in phantom or by dashed lines.

As illustrated in at least FIGS. 2A, 2B, 4A and 4B, the plurality of cooling openings 94 and 104 and their associated diffusers 98 and 108 are arranged in arrays 116 and 118 of radially oriented cooling openings 94, 104 with "trenched" or "grooved" diffusers 98 and 108 located in a pressure side shelf 90 and a pressure side tip 100. In one embodiment, the arrays 116 and 118 are located proximate to a tip portion 88 of an airfoil 78 and more particularly in a convex portion 120 of a pressure side 84 of the airfoil 78. Still further and in one embodiment, the diffusers 98 and 108 are at least located within the walls of the airfoil proximate to the pressure side shelf 90 and a pressure side tip 100 such that the cooling air flow diffusion begins to occur prior to it reaching the surface of the pressure side shelf 90 and the pressure side tip 100. For example and as illustrated in at least FIG. 3 angle $\theta_{3a}$ and/or $\theta_{3b}$ begins below the surface of the airfoil 78 and thus the cooling air flow diffusion begins internally before the airflow exits the interior of the airfoil walls. In one embodiment, the convex portion 120 is located proximate to the tip portion 88 of the airfoil 78. Still further, this convex portion 120 is located between the leading edge 80 and trailing edge 82 of the airfoil 78.

By locating the arrays 116 and 118 in a convex portion 120 of a pressure side 84 of the airfoil 78 premature tip oxidation distress are mitigated. The location and orientation of the film cooling holes 94, 104 and their associated diffusers 98, 108 are provided at the pressure side tip shelf and pressure side tip airfoil region such that they are aligned with the local external tip airfoil streamlines. Although the pressure side airfoil surface is convex as illustrated in this embodiment (See at least FIG. 2A, 2B) it should be understood that the incorporation of film cooling holes 94, 104 are not limiting by the current airfoil 84 pressure side 78 convex surface curvature. To those skilled in the art that the pressure side airfoil 78 may also be of a concave surface, and/or comprise of both concave and convex surface curvatures dependent on aerodynamic performance requirements. See for example, FIG. 2C which illustrates an airfoil with a concave surface proximate to the tip portion. In either instance, the functionality and incorporation of film cooling holes 94, 104 may be utilized to provide the same functionality as described within. Accordingly, the diffusion of the film cooling provided by film cooling holes 94, 104 and their associated diffusers 98, 108 is expanded in the direction of a favorable pressure gradient which improves film cooling characteristics and film effectiveness. The lateral expansion of the diffused cooling holes in the direction of arrows 124 is intended to increase the geometric and film coverage at the exit plane of the film hole where the colder cooling air is ejected onto the local airfoil surface, thereby insulating it from the local external free stream gas temperatures.

By locating arrays 116 and 118 in the pressure side 84 of the airfoil 78 improved film cooling is achieved with the radially oriented trenched film hole layout and the local heat flux at the airfoil tip region is greatly reduced and the subsequent metal temperatures are also therefore reduced. The reduction in absolute blade airfoil tip metal temperatures improves the durability of the blade tip, increasing the oxidation and thermal mechanical fatigue capability and tip life. The improved blade tip cooling design will ensure the running tip clearance between the rotating blade airfoil and the blade out air seal (BOAS) is retained throughout the life cycle of the engine. The tighter (smaller) running tip clearances ensure turbine design component efficiencies are maintained thereby minimizing the deterioration in engine performance.

As mentioned above, premature tip oxidation and resulting Thermal Mechanical Fatigue (TMF) distress is undesirable in that it will adversely impact engine time on wing which thus results in a reduction the refurbishment intervals of the hot section of the engine.

The proposed disclosure incorporates a high density radially oriented "trenched" or "grooved" pressure side tip and pressure side shelf film cooling concept in order to prevent premature blade tip oxidation distresses. The location and orientation of the film cooling holes at the pressure side tip airfoil region and in the pressure side tip shelf are aligned with the local external tip airfoil streamlines. The diffusion of the film cooling is expanded in the direction of a favorable pressure gradient which improves film cooling characteristics and film effectiveness. The lateral expansion of the diffused cooling holes is intended to increase the geometric and film coverage at the exit plane of the film hole where the colder cooling air is ejected onto the local airfoil tip surface 102 proximate the tip region 88, thereby insulating it from the local external free stream gas temperatures.

As a result of the improvements in film cooling achieved with the proposed radially oriented trenched film hole design layout the local heat flux at the airfoil tip region is greatly reduced and the subsequent metal temperatures are also therefore reduced. Accordingly, this mitigates the early onset of excessive tip oxidation and increased tip clearances that result in lower turbine stage and component efficiency. Reductions in turbine efficiency associated with increased tip clearances result in increases in intermediate turbine temperatures (ITT) and low pressure turbine (LPT) exhaust gas temperature (EGT) which increases the inter-stage gas temperatures and also reduces downstream hot section component lives. The reduction in absolute blade airfoil tip metal temperatures improves the durability of the blade tip, increasing the oxidation and thermal mechanical fatigue capability and tip life. The improved blade tip cooling design will ensure the running tip clearance between the rotating blade airfoil and the blade out air seal (BOAS) is retained throughout the life cycle of the engine.

In one embodiment, the cooling holes 94, 104 and their associated diffuser portions 98, 108 are formed by any method of manufacture including but limited to, electrical discharge machining (EDM) process, laser ablation, micro water-jet laser assist, additively manufactured via a Direct Metal Laser Sintering (DMLS) process, fabricated utilizing additive manufactured ceramic cores, and/or fugitive core casting manufacturing processes.

In addition and in one embodiment and as illustrated in at least FIGS. 2A-2B, 3, 4A and 4B, the pressure side of the blade 74 at least proximate to the tip is illustrated as being convex. The combination of the arrays 116, 118 of openings on a tip or tip portion 88 with a convex pressure side tip may provide improved film effectiveness and cooling on highly thermally loaded blade tips, which in some embodiments may have a concave portions located in other areas of the pressure side of the blade 74. Accordingly various embodiments of the present disclosure contemplate the aforementioned arrays 116, 118 of openings with a blade 74 that may have a convex pressure side configuration proximate to the tip 88. As mentioned above, other portions of the pressure side of the blade may be concave. Although, the illustrated embodiments contemplate a convex pressure side proximate to the tip it is, of course, also understood that the arrays 116, 118 of openings may be used with a blade that may have a different pressure side configuration such as convex or concave or any combination thereof, which may be proximate to the tip or in other locations. Still further, the suction side 86 of the blade either proximate to or away from the tip may be concave or convex in shape depending on the application.

Although various embodiments are illustrated, it is understood that various embodiments of the present disclosure contemplate any combination of the foregoing (e.g., openings 94, 104 with associated diffusers 98, 108 in tip portion 88 with or without squealer pocket 92 or pockets 92 and/or tip shelf 90). Still further and while the openings 94, 104 with associated diffusers 98, 108 and/or arrays 116, 118 is/are illustrated as being located proximate to the pressure side 84 of the airfoil 78 it is understood that openings 94, 104 with associated diffusers 98, 108 and/or arrays 116, 118 can be located proximate to the suction side 86 or both pressure and suction sides of the airfoil 78.

In addition and as illustrated in the attached FIGS. the airfoil 78 may further include a plurality of additional cooling openings (not shown) in addition to the aforementioned openings 94, 104 with associated diffusers 98, 108 and/or arrays 116, 118. These cooling openings may be located in anyone of the tip portion, the leading edge, the trailing edge, the pressure side, the suction side or any combination of the foregoing.

The benefits of this disclosure include improved cooling film effectiveness and cooler tip surfaces. By using this technology the tip temperatures can be reduced for a set amount of cooling flow.

As mentioned above and although various embodiments of the present disclosure are related to turbine blades with openings 94, 104 with associated diffusers 98, 108 and/or arrays 116, 118 for abating the heatload on the tip of the airfoil of the turbine blade as well as preventing the detrimental effects associated with leakage airflows. It is, of course, understood that embodiments of this disclosure may be applied on any turbomachinery component that requires the aforementioned cooling or tip cooling. For example, openings 94, 104 with associated diffusers 98, 108 and/or arrays 116, 118 may be positioned on compressor blades of the gas turbine engine, stationary vanes, blade outer air seals (BOAS) or any other component or surface requiring cooling or film cooling. The aforementioned turbine blades, compressor blades, stationary vanes, blade outer air seals (BOAS) or any other component or surface may be collectively referred to as component or an engine component or gas turbine engine component. Accordingly, openings 94, 104 with associated diffusers 98, 108 and/or arrays 116, 118 may be positioned on a surface of the component or an engine component or gas turbine engine component.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A component for a gas turbine engine, comprising:
   an airfoil having a tip portion;
   a tip shelf located in the tip portion;
   a first plurality of cooling openings located in an edge of the tip shelf that is defined by a pressure side wall that terminates at the tip shelf and extends along at least a portion of a pressure side of the airfoil; and
   a second plurality of cooling openings located in an edge of a tip wall portion extending radially from the tip shelf, the edge of the tip wall portion being radially separated from the tip shelf and the edge of the tip wall portion defines a portion of a surface of the tip portion radially separated from the tip shelf that extends along at least a portion of a pressure side of the tip portion.

2. The component as in claim 1, wherein each of the first plurality of cooling openings have a diffuser portion formed in the edge of the tip shelf.

3. The component as in claim 2, wherein each of the second plurality of cooling openings have a diffuser portion formed in the edge of the tip wall portion.

4. The component as in claim 3, wherein each diffuser portion has a fillet edge located therein.

5. The component as in claim 4, wherein at least a portion of the edge of the tip shelf is convex in shape.

6. The component as in claim 1, wherein at least a portion of the edge of the tip shelf is convex in shape.

7. The component as in claim 1, further comprising a squealer pocket located in another surface portion of the tip portion.

8. The component as in claim 1, wherein the component is a turbine blade.

9. The component as in claim 8, wherein each of the first plurality of cooling openings have a diffuser portion formed in the edge of the tip shelf and wherein each of the second plurality of cooling openings have a diffuser portion formed in the edge of the tip wall portion.

10. The component as in claim 9, wherein each diffuser portion has a fillet edge located therein.

11. The component as in claim 9, wherein at least one diffuser portion of the first plurality of cooling openings and at least one diffuser portion of the second plurality of cooling openings has a fillet edge located therein.

12. The component as in claim 11, wherein at least a portion of the edge of the tip shelf is convex in shape and wherein at least a portion of the edge of the tip shelf is convex in shape.

13. The component as in claim 8, wherein at least a portion of the edge of the tip shelf is convex in shape and wherein at least a portion of the edge of the tip shelf is convex in shape.

14. The component as in claim 13, further comprising a plurality of squealer pockets located in another surface portion of the tip portion.

15. The component as in claim 8, further comprising a squealer pocket located in another surface portion of the tip portion.

16. A gas turbine engine, comprising:
    a compressor section;
    a combustor section; and
    a turbine section; wherein the turbine section includes a plurality of rotors having a plurality of radially disposed rotor blades at least some of the plurality of radially disposed rotor blades having:
    an airfoil, the airfoil having a tip portion;
    a tip shelf located in the tip portion;
    a first plurality of cooling openings located in an edge of the tip shelf that is defined by a pressure side wall that terminates at the tip shelf and extends along at least a portion of a pressure side of the airfoil; and
    a second plurality of cooling openings located in an edge of a tip wall portion extending radially from the tip shelf, the edge of the tip wall portion being radially separated from the tip shelf and the edge of the tip wall portion defines a portion of a surface of the tip portion radially separated from the tip shelf that extends along at least a portion of a pressure side of the tip portion.

17. The gas turbine engine as in claim 16, wherein each of the first plurality of cooling openings have a diffuser portion formed in the edge of the tip shelf and wherein each of the second plurality of cooling openings have a diffuser portion formed in the edge of the tip wall portion.

18. The gas turbine engine as in claim 17, wherein at least one diffuser portion of the first plurality of cooling openings and at least one diffuser portion of the second plurality of cooling openings has a fillet edge located therein.

19. The gas turbine engine as in claim 16, wherein at least a portion of the edge of the tip shelf is convex in shape and wherein at least a portion of the edge of the tip shelf is convex in shape.

20. A method of cooling a portion of a component of a gas turbine engine, comprising:
    forming a first plurality of cooling openings in an edge of a tip shelf that is defined by a pressure side wall that terminates at the tip shelf and extends along at least a portion of a pressure side of an airfoil of the component; and
    forming a second plurality of cooling openings in an edge of a tip wall portion extending radially from the tip shelf, the edge of the tip wall portion being radially separated from the tip shelf and the edge of the tip wall portion defines a portion of a surface of a tip portion of the airfoil radially separated from the tip shelf that extends along at least a portion of a pressure side of the tip portion, wherein the first plurality of cooling openings and the second plurality of cooling openings are in fluid communication with an internal plenum of the airfoil.

* * * * *